United States Patent [19]

Olivotto

[11] 4,276,075
[45] Jun. 30, 1981

[54] MACHINE FOR THE MANUFACTURE OF GLASS ARTICLES BY BLOW MOULDING GLASS

[75] Inventor: Vanfrido Olivotto, Turin, Italy

[73] Assignee: Olivotto Vetromeccanica S.a.s., Turin, Italy

[21] Appl. No.: 92,003

[22] Filed: Nov. 7, 1979

[30] Foreign Application Priority Data

Nov. 30, 1978 [IT] Italy .............................. 69747 A/78

[51] Int. Cl.³ ............................................ C03B 11/02
[52] U.S. Cl. ........................................ 65/160; 65/161; 65/164; 65/229; 65/241
[58] Field of Search ................. 65/159, 160, 164, 240, 65/241, 229

[56] References Cited

U.S. PATENT DOCUMENTS

| | | | |
|---|---|---|---|
| 1,878,465 | 9/1932 | Canfield | 65/159 X |
| 2,225,898 | 12/1940 | Benoit et al. | 65/159 |
| 2,238,198 | 4/1941 | Weber | 65/159 X |
| 3,418,096 | 12/1968 | Bathellier | 65/160 X |
| 3,529,948 | 9/1970 | Eldred et al. | 65/159 |
| 4,039,311 | 8/1977 | Bardet | 65/241 X |

*Primary Examiner*—Arthur D. Kellogg
*Attorney, Agent, or Firm*—Sughrue, Rothwell, Mion, Zinn and Macpeak

[57] ABSTRACT

A machine for the manufacture of glass articles by blow moulding comprises a plurality of article-forming assemblies mounted in a circular array on a rotatable carousel. Each assembly has a number of operating means which cooperate to shape a gob of molten glass, first by rough-blanking using a plunger, and then by blow-moulding, into the required article. Control of said operating means is effected by a set of primary control members adjustably positioned in fixed locations around the carousel, and a respective set of carousel-mounted secondary control members associated with each assembly. As the carousel rotates, the secondary control members are moved past and influenced by corresponding ones of the primary control members and, as a result, the operating means of each assembly are appropriately controlled to shape the required article.

21 Claims, 20 Drawing Figures

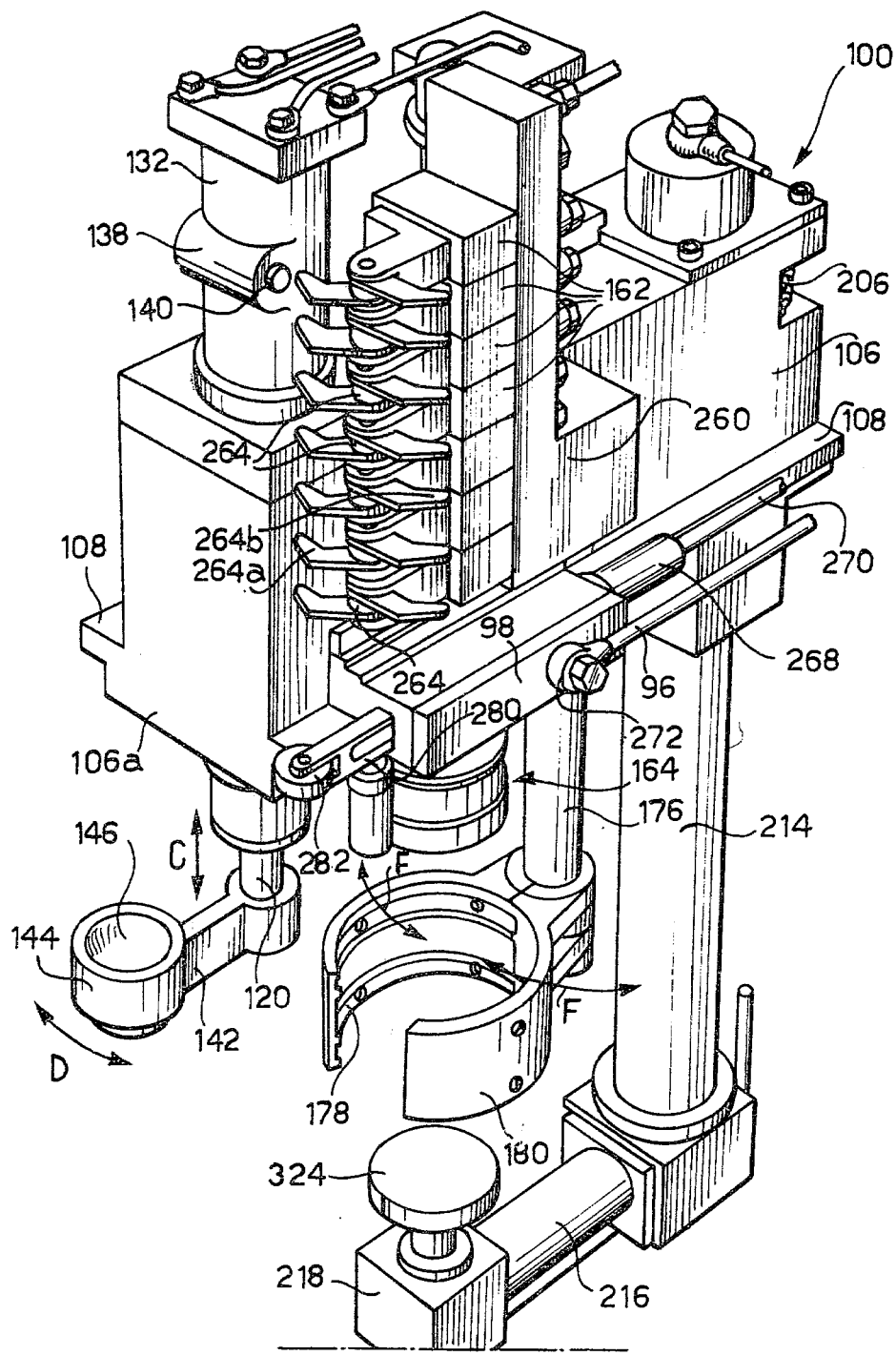

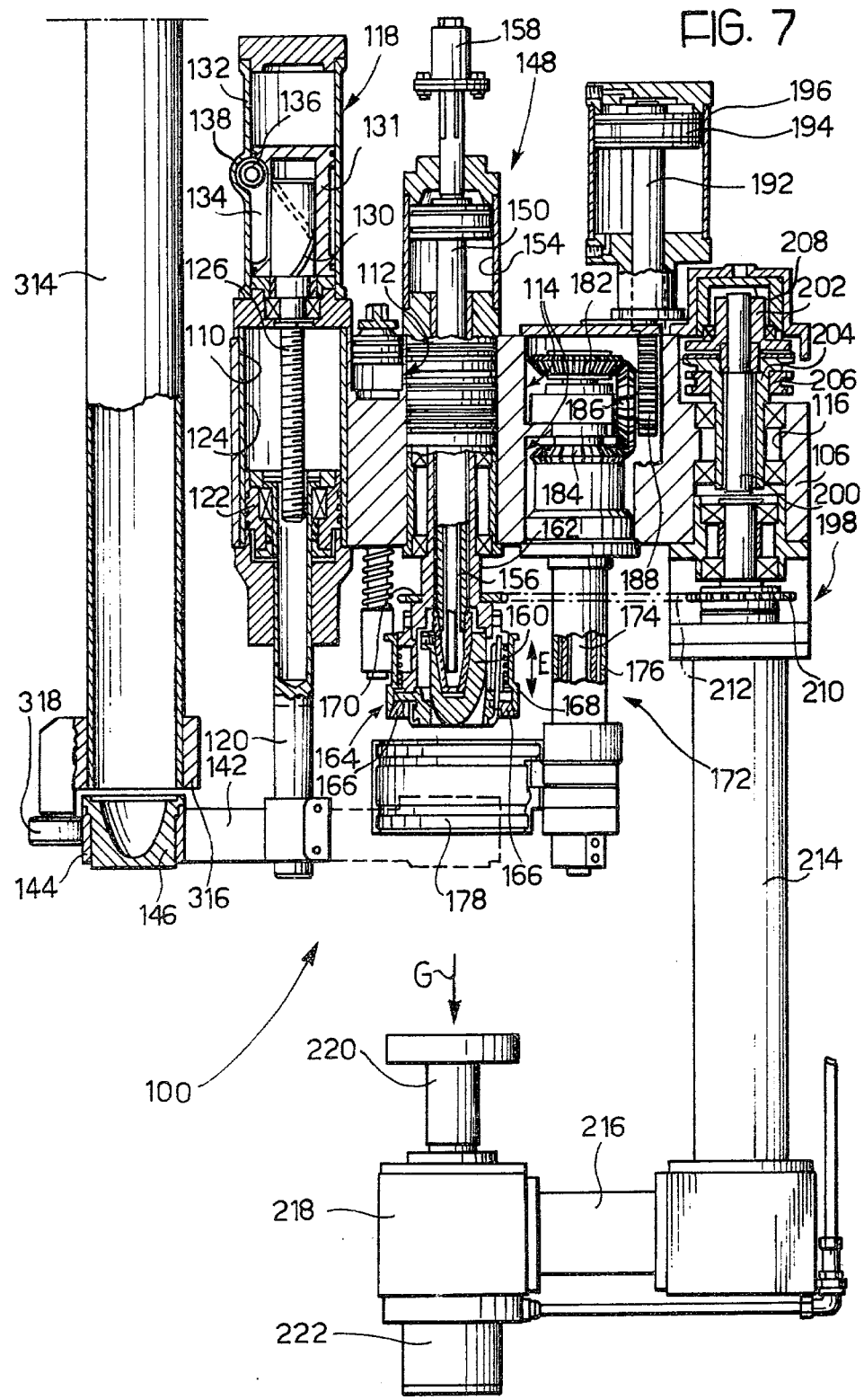

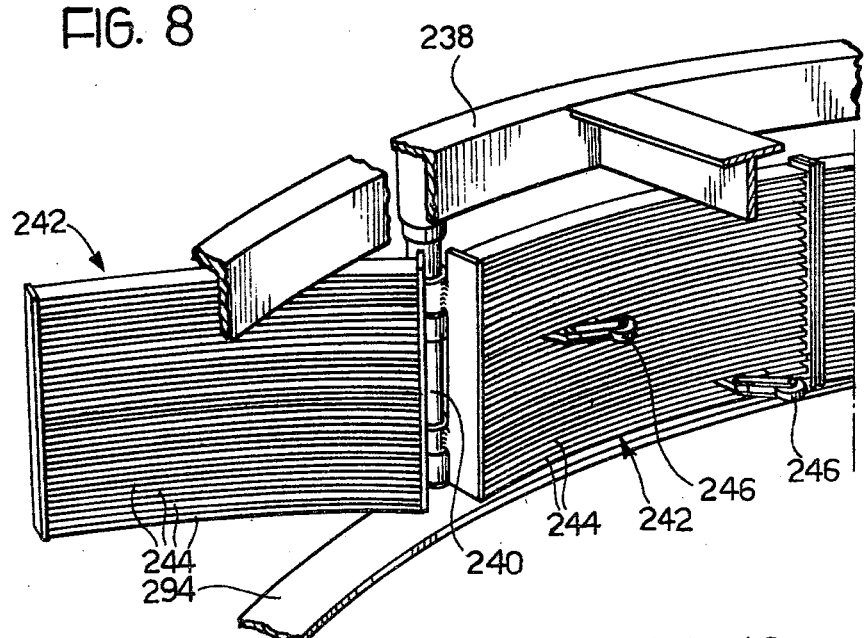
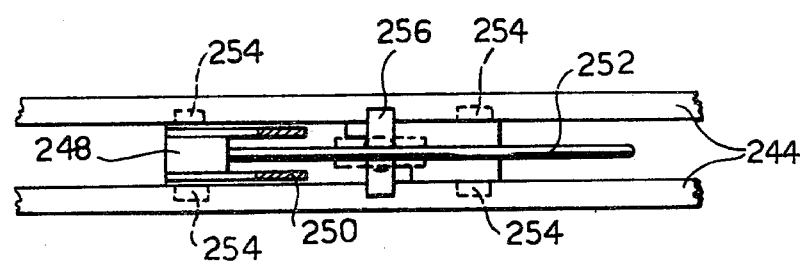
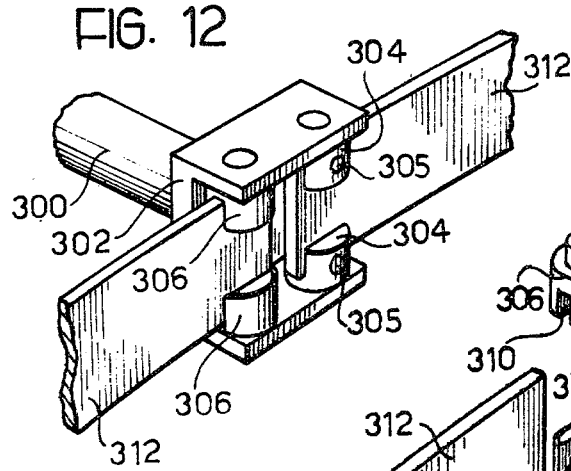
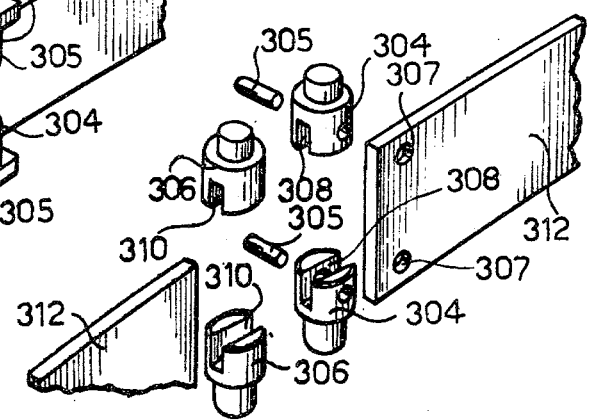

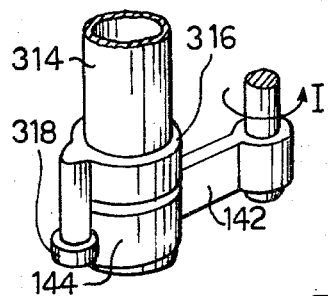
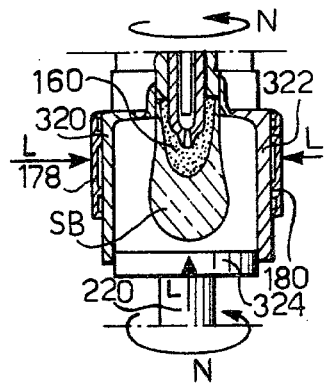
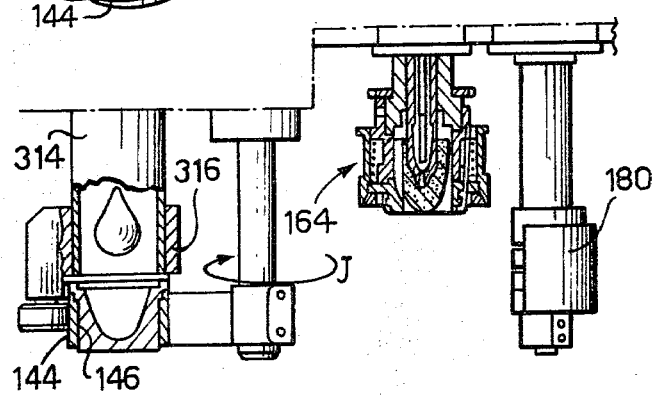
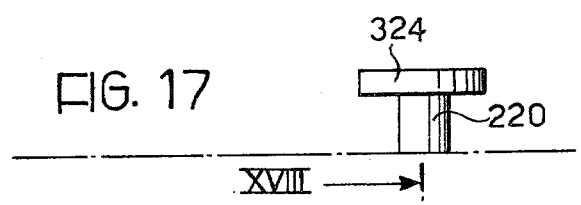
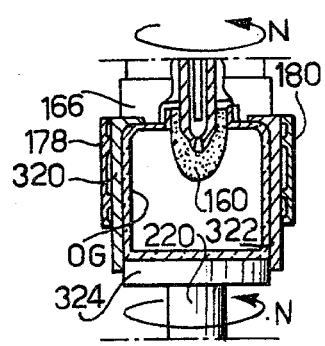
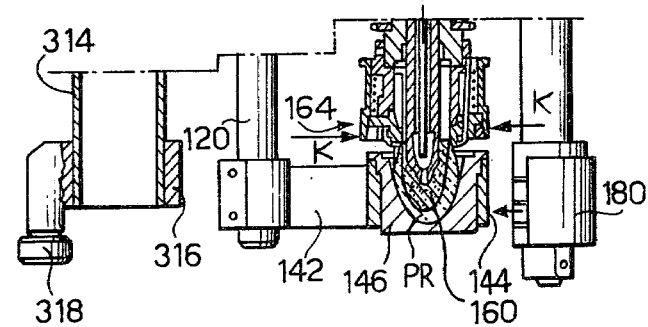
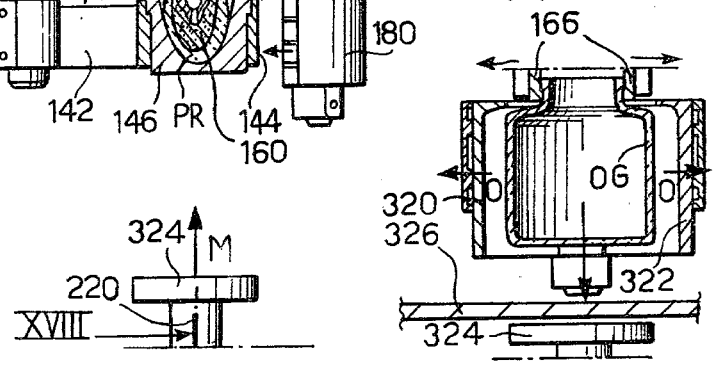

MACHINE FOR THE MANUFACTURE OF GLASS ARTICLES BY BLOW MOULDING GLASS

BACKGROUND OF THE INVENTION (1) Field of the Invention

The present invention relates to a machine for the manufacture of glass articles by blow moulding.

(2) Description of the Prior Art

Blow-moulding machines are known for forming glass articles which comprise feed means for supplying a succession of gobs of molten glass, receiving means for receiving consecutive gobs of molten glass from the feed means, rough-blanking means including a plunger for consecutively moulding each said molten-glass gob into a rough-blank, blow-moulding means for blowing each rough blank in a mould to form a required glass article, and control means for controlling the said receiving, rough-blanking and blow-moulding means to operate in a predetermined work cycle. Such machines may also include auxiliary means for forming and/or transfer of the gobs, of the rough-blanks and of the finished articles.

The known machines for the manufacture of articles by blow moulding (such as, for example the noted I.S. machine) lack versatility and generally use complicated mechanisms for transferring the rough-blanks into the finishing moulds.

It is an object of the present invention to provide a blow-moulding machine which is extremely versatile and yet extremely simple and economic in form.

SUMMARY OF THE INVENTION

According to the present invention there is provided a machine for the manufacture of glass articles by blow moulding, comprising:

a carousel mounted for rotation about a vertical axis, drive means for continuously rotating said carousel, a plurality of article-forming assemblies mounted on the carousel in a circumferentially-extending series and each comprising receiving means for receiving a gob of molten glass fed to the assembly, rough-blanking means including a plunger for moulding said molten-glass gob into a rough-blank, and blow-moulding means for blow-moulding the rough-blank into a required glass article, the said receiving, rough-blanking, and blow-moulding means of each assembly including a number of independently controllable operating means for moving and forming the molten glass, a feed station fixed adjacent the carousel and arranged to deliver a said gob of molten glass to the receiving means of each article-forming assembly in turn as it is moved therepast by rotation of the carousel, and control means for controlling the said operating means of each said assembly to function in accordance with a predetermined work cycle in the forming of a said glass article, said control means comprising a set of primary control members arranged in an adjustable manner in predetermined fixed positions around said carousel adjacent hereto, a respective set of secondary control members associated with each article forming assembly for movement therewith during rotation of the carousel, the secondary members of each set being arranged to control respective ones of said operating means of the associated assembly and being mounted on or adjacent that assembly in such positions that as the carousel rotates, the secondary control members are moved past and are influenced by respective said primary control members to control said operating means to operate in a sequence and with a timing dependent on the arrangement of said primary control members, the secondary control members which control corresponding operating means of different said assemblies being arranged in corresponding positions relative to their respective assemblies whereby the assemblies consecutively execute identical work cycles.

BRIEF DESCRIPTION OF THE DRAWINGS

A blow-moulding machine embodying the invention will now be particularly described, by way of non-limiting example, with reference to the accompanying drawings, in which:

FIG. 5 is a perspective view of an article-forming assembly of the machine;

FIG. 7 is a partially-sectioned elevation to an enlarged scale of the assembly shown in FIGS. 5 and 6;

FIG. 8 is a perspective view showing part of a series of circumferential guides which serve to mount control members in the form of rollers arranged to operate controlling cams of the article-forming assemblies;

FIG. 10 is a view taken substantially in the direction of arrow X in FIG. 9;

FIG. 12 is a perspective view to an enlarged scale of a detail of the linear cam shown in FIG. 11;

FIG. 13 is an exploded perspective view of some of the elements shown in FIG. 12;

FIG. 15, is a perspective view of the lower end of a drop tube of a glass gob feed station, and of a cup cooperating with the drop tube to receive a gob of molten glass;

FIG. 16 is a part-sectional side view of part of an article-forming assembly and illustrates an initial phase of a typical work cycle for an article-forming assembly of the machine;

FIG. 17 is a partially sectioned view, similar to FIG. 16, showing a subsequent phase of the work cycle;

FIG. 18 is a section on line XVIII—XVIII of FIG. 17, but relating to a subsequent phase of the work cycle; and FIGS. 19 and 20 are sections similar to that in FIG. 18, which illustrate yet a further phase of the work cycle.

DESCRIPTION OF THE PREFERRED EMBODIMENT

Figure 1:
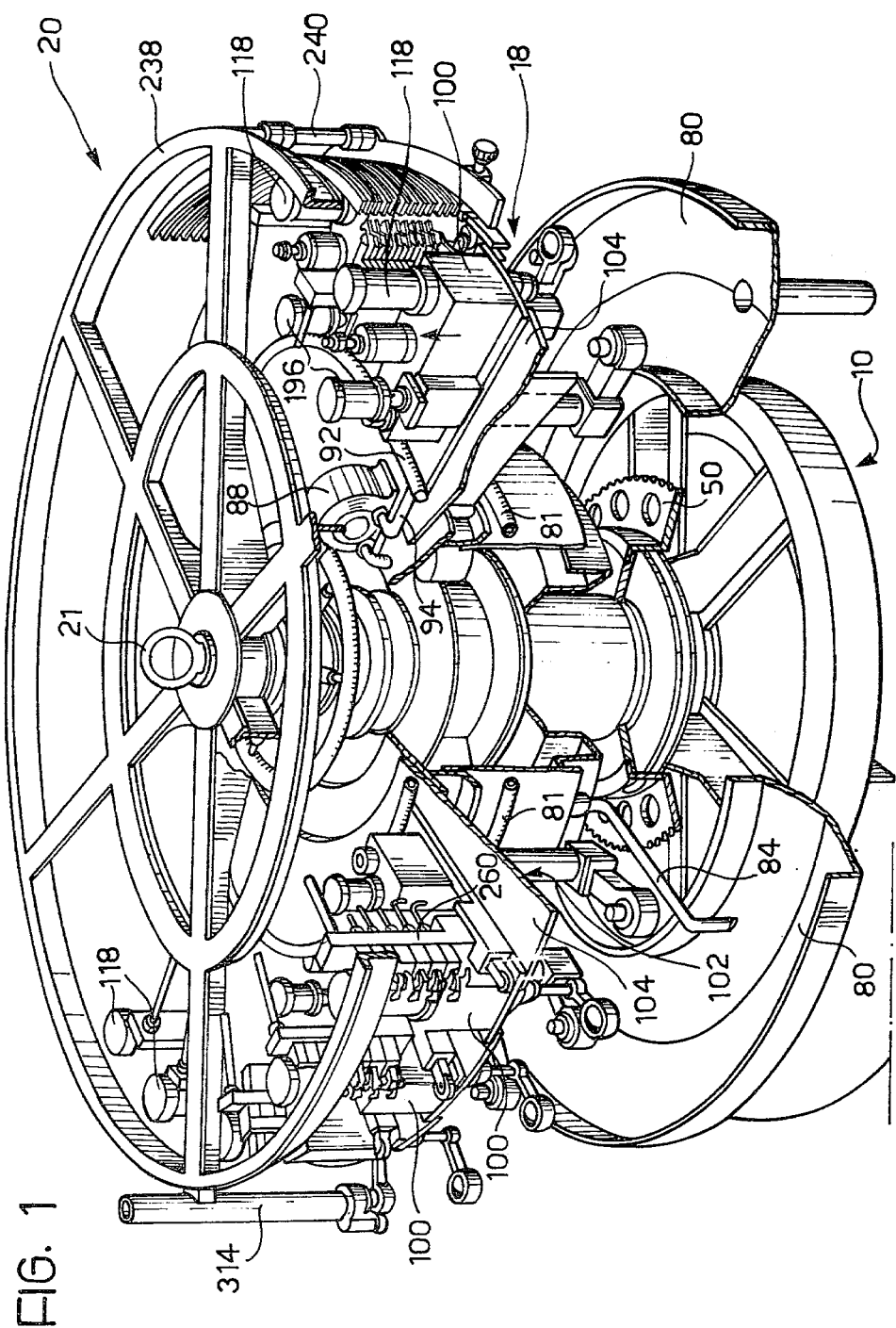
FIG. 1 is a part cut-away perspective view of the machine.
Figure 2:
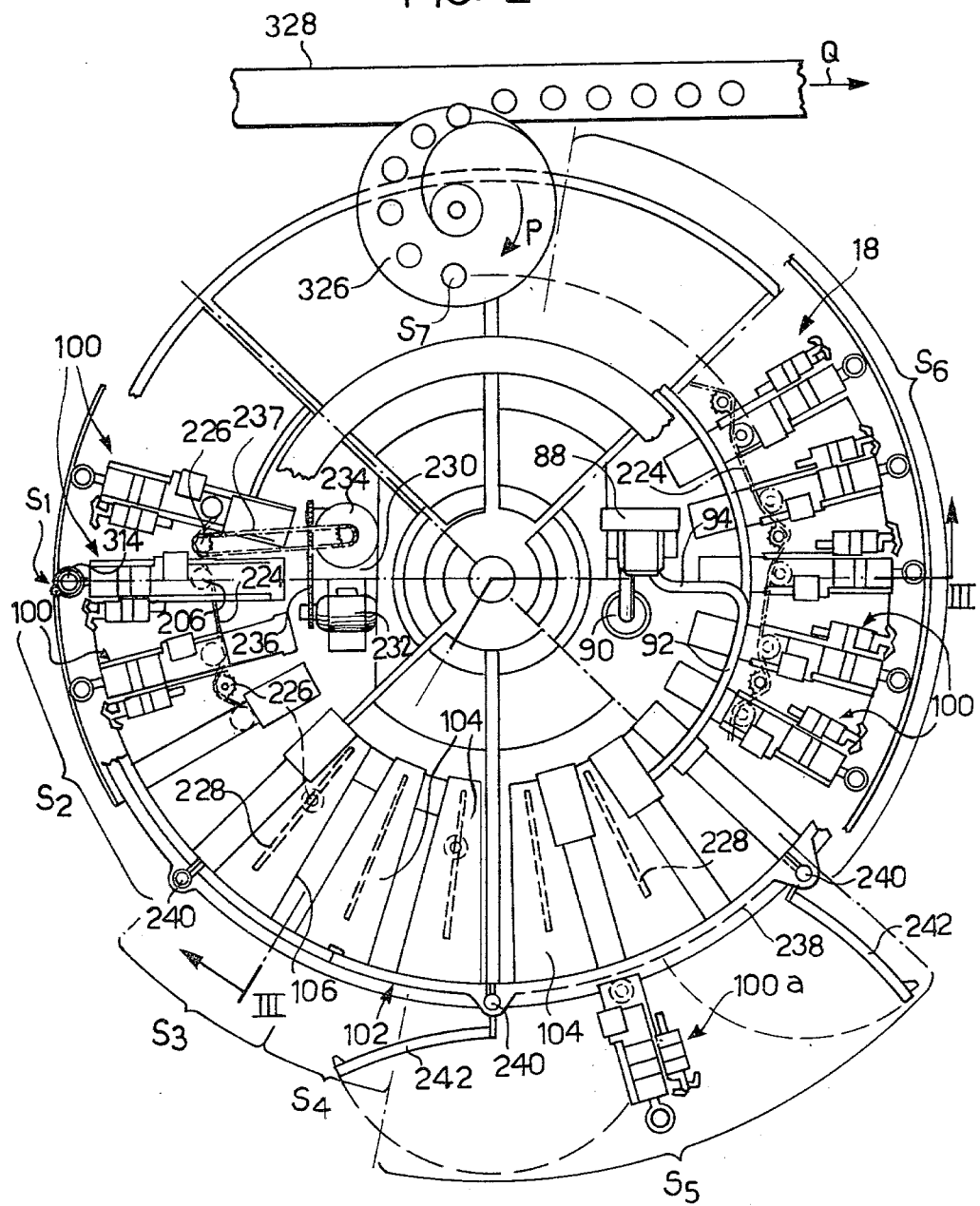
FIG. 2 is a part cut-away plan view of the machine.
Figure 3:
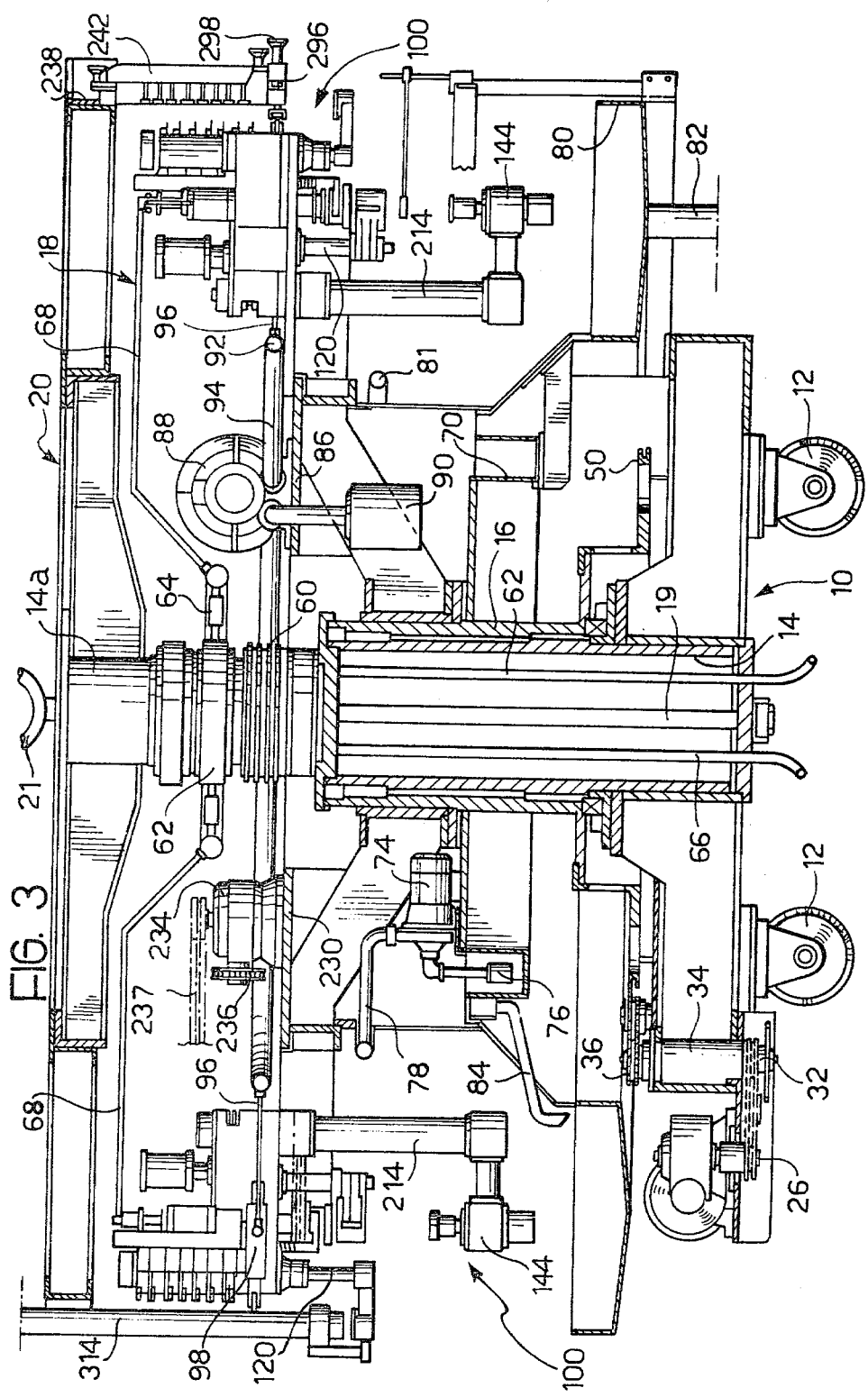
FIG. 3 is a vertical section on line III—III of FIG. 2.

As shown in FIGS. 1 to 3, the blow-moulding machine for the manufacture of glass articles comprises a substantially circular base 10 formed by welded metal sections and supported on swivel-mounted wheels 12 which enable the machine to be readily moved, for example, for maintenance purposes.

The base 10 includes a central vertical column 14 of tubular form around which a central tubular hub 16 of a vertical axis carousel 18 is rotatably supported. The carousel 18 comprises a carrying structure formed for the most part by welded metal sections and by metal plates. As will be described more fully hereinafter, the carousel 18 carries a plurality of identical article-forming assemblies 100 each arranged to form a respective glass article during each rotation of the carousel 18.

The central column 14 of the base extends upwards above hub 16, into a tubular upright 14a which is secured to the base 10 by a central stay rod 19 and which supports a circular superstructure 20 above the level of the carousel 18. The superstructure 20 is also mainly composed of metal sections.

A lifting eye 21 is fixed at the upper end of stay rod 19 in the centre of superstructure 20 and enables the machine to be transported by means of an overhead carrying crane or similar device.

Figure 4:
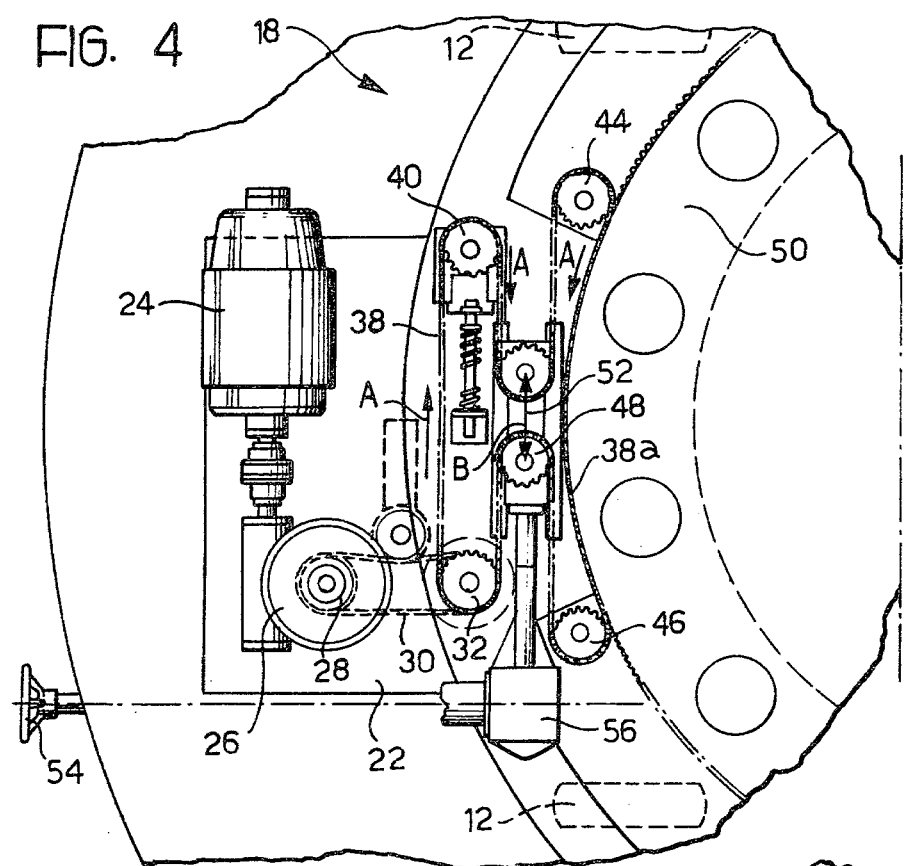
FIG. 4 is a horizontal section of part of the machine taken on line IV—IV of FIG. 3.

As shown in FIGS. 3 and 4, the base 10 includes a bracket structure 22 on which is mounted a direct current, variable speed electric motor 24. The motor 24 drives a chain wheel 28 through a worm reduction unit 26. A chain 30 transmits rotation of the chain wheel 28 to a driven chain wheel 32 which is keyed onto a vertical transmission shaft mounted in a sleeve 34. Keyed onto the same transmission shaft is a driving sprocket 36. The sprocket 36 is engaged by a transmission chain 38 which serves to transmit rotation of the sprocket 36 to the carousel 18. The chain 38 follows the circuitous route indicated by arrow A in FIG. 4, first passing around a tensioning sprocket 40 and then around the transmission sprockets 42, 44, 46, 48. The sprockets 44 and 46 serve to maintain a length 38a of chain 38 in engagement with a toothed ring 50 which is rigidly connected to the hub 16 of the carousel 18.

The two sprockets 42 and 48 are carried on a slide 52 which can be moved to and fro in the direction indicated by the double-headed arrow B using a hand control wheel 54. Rotation of the hand wheel 54 is transmitted by shafting via a right-angle transmission 56 to an internally screw-threaded assembly 58 which carries the slide 52. The assembly 58 serves to convert rotation of the hand wheel 54 in either direction into linear movement of the slide 52 in a corresponding one of the directions indicated by arrow B. Adjustment of the position of the two slide-mounted sprockets 42, 48 by rotation of the hand wheel 54, enables the movement of the article-forming assemblies 100 carried by the carousel 18 to be synchronised with the feeding of molten glass gobs to the machine as will be further explained below.

Since the motor 24 is of the variable speed type, the carousel 18 can be rotated either at a constant speed or at a speed selected as desired.

Referring again to FIGS. 1 to 3, the lower part of upright 14a carries a fixed ring electrical commutator 60.

The commutator is connected to an electrical cable 62 which passes down through the central column 14 to a control panel (not illustrated). Brushes carried on the carousel 18 (not shown) slidingly engage the rings of the commutator 60, and serve to feed various pieces of electrical equipment (motors and similar) to be more fully described hereinafter.

Mounted on the upright 14a above the commutator 60 is the stator part 62 of a rotating compressed-air coupling, the rotor part of which is formed by a ring type distributor 64, turning with carousel 18. The stator part 62 is connected via a pipe 66 to a compressed air distribution network or to an air compressor. Leading off from the annular distributor 64 are a number of pipes 68 which serve to supply compressed air to the assemblies 100 mounted on the carousel 18.

Around the hub 16 of the carousel 18, the base carries a structure, made of plating, which forms inner and outer annular water tanks 70 and 80 respectively. The tank 70 is a water supply tank and is fed with water from a normal mains water supply network through a pipe (not shown). The hub 16 of carousel 18 carries a bracket 72 which supports an electric pump 74, the electric motor of which is electrically energised via the commutator 60.

The electric pump 74 is provided with an inlet mouthpiece in the form of a suction rose 76 which continuously draws in water from the tank 70 during the rotation of carousel 18. The delivery pipeline 78 of the electric pump 74 terminates in an annular distributor 81 from which lead off feed pipes (not shown) for supplying cooling water to the article-forming assemblies 100.

The tank 80 forms a water discharge tank and is situated under the assemblies 100 to receive cooling water discharged from them after use. In one of its lowest points the tank 80 is provided with a discharge pipe 82 which serves to discharge water directly to a sewer or the like. The water supply tank 70 is provided with an overflow pipe 84 which discharges into the tank 80.

It will be appreciated that the described cooling feed system has the advantage of enabling a continuous circulation of cooling water to take place without the need for rotating couplings which, in addition to being costly, can be the source of undesirable water losses.

Above the level of the bracket 72, the carousel 18 carries a bracket 86. The bracket 86 mounts a motor compressor 88, the electric motor of which is electrically energised via the commutator 60. The compressor 88 takes in air from the atmosphere through an intake filter 90 and after compressing the air to slightly above atmospheric pressure, feeds it through a delivery pipe 94 to a further annular air distributor 92. The low pressure air delivered by motor compressor 88 serves for the blowing of the glass articles during moulding, as will be described later. To this end there are linked to distributor 92 as many pipes 96 as there are assemblies 100. Each pipe 96 terminates in a blowing-control valve 98 which will be described in detail hereinafter.

The provision of the motor compressor 88 on the carousel 18 has the advantage of avoiding the need for rotating compressed-air couplings with their attendant problems of sealing and wear. In this respect, it should be noted that as a rule, the air under pressure which passes through such rotating couplings should contain lubricant to ensure efficient working of the couplings; in contrast, air used for blowing during moulding must contain absolutely no lubricant, however small a quantity, as this could have an extremely damaging effect on the quality of the blown articles.

The arrangement and construction of the article-forming assemblies 100 will now be described. The assemblies 100 are carried on a horizontal annular support structure 102 of the carousel 18 which is disposed at approximately the same level as the bracket 86 but radically outwards thereof. The support structure 102 comprises a framework of metal sections carrying a number of sector plates 104 which are all identical to one another and are equi-angularly spaced around the carousel 18. Adjacent plates 104 are spaced from each other by parallel-edged radial slots 106, each of which defines a seat for one of the operating assemblies 100.

In FIG. 5 one of the assemblies 100 is shown separate from the machine. The assembly 100 comprises a stout block 106 (for example, a steel casting) which is generally parallapiped in shape and is provided towards its lower end with a pair of opposed flanges 108. With a lower part 106a of the block 106 inserted in a slot 106, the flanges 108 are intended to rest on the edges of the adjacent sector plates, 104. The flanges 108 and the lower block part 106a thus form a guide enabling the block 106 to be moved radially inwards and outwards along its slot 106 for insertion and removal from the machine. Each block 106 is fixed in its correct position by means of bolts or similar members (not shown) which engage with the adjacent plates 104. It will be appreciated that the described arrangement for the mounting of the blocks 106 renders their removal and reinstallation into the machine for maintenance purposes extremely easy.

Figure 6:
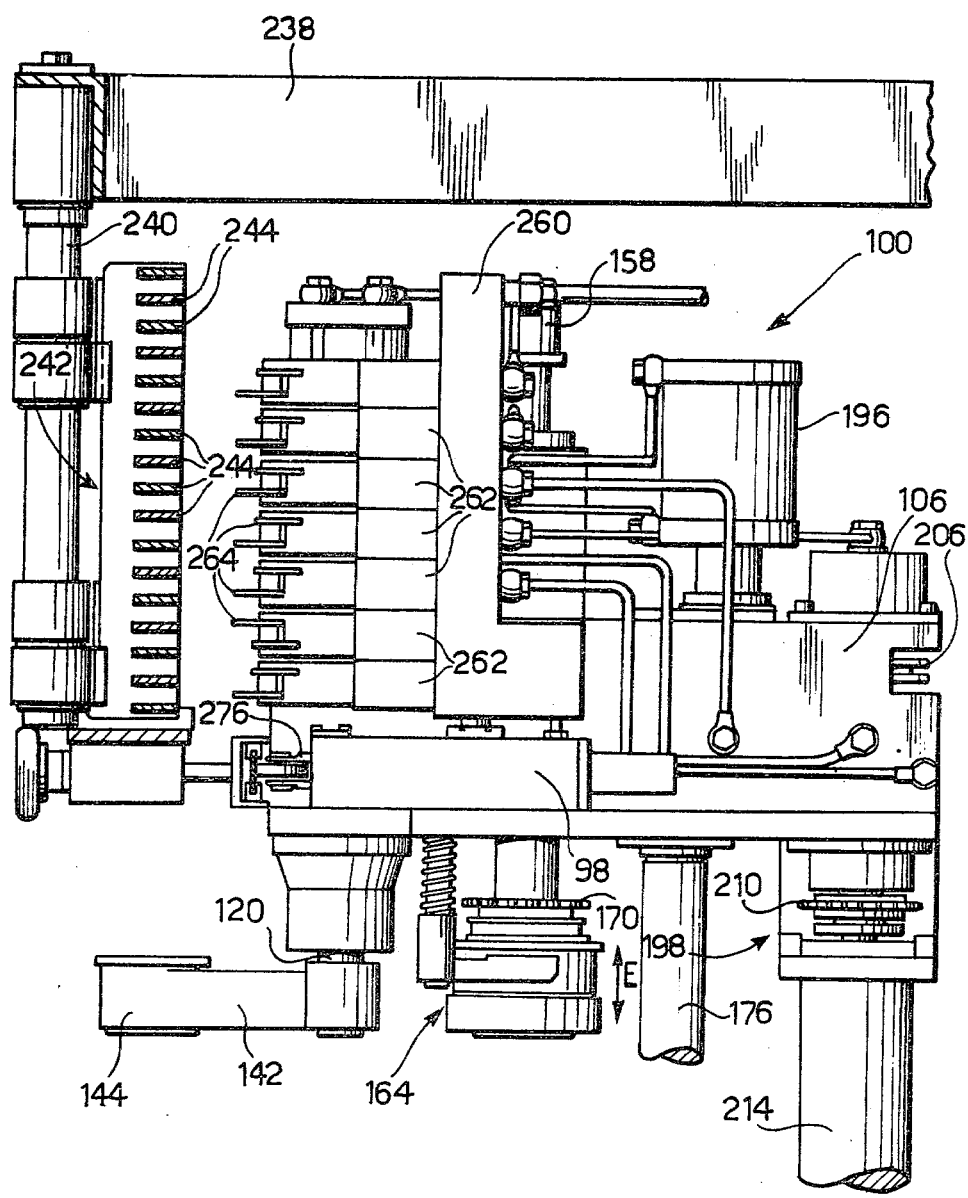
FIG. 6 is a side elevation of the article-forming assembly shown in FIG. 5.

In describing the detailed contruction of the assembly 100, reference will be made to FIGS. 6 and 7 in addition to FIG. 5. The block 106 has four seats 110, 112, 114 and 116 each of which is formed by a substantially vertical cylindrical hole. These seats 110, 112, 114 and 116 are arranged in a row which is aligned with the longitudinal direction of the block itself (that is, the radial direction of the machine). Each seat supports a respective operating unit of columnar form.

The radially outermost seat 110 supports a first operating unit 118 which incorporates a revolving and sliding vertical shaft 120. The shaft 120 extends upwards from below the block 106 to connect with a piston 122 sliding in a double-acting pneumatic cylinder 124 of the unit 118. The shaft 120 is extended above the piston 122 by a rod 126 which is connected at its upper end to an upper cylindrical head 128 formed with a helical grooving 130. The cylindrical head 128 projects into an internal cavity of a piston 131 movable in an upper pneumatic cylinder 132. The piston 131 is internally provided with a projection which engages in the helical grooving 130 of the head 128. By means to be described below, rotation of the piston 131 within the cylinder is prevented and as a result, to and fro movement of the piston will cause rotation of the shaft 120 via the internal projection of the piston 131 and the grooving 130.

Rotation of the piston 131 is prevented by means of a small roller 136 which is rotatably mounted in a boss 138 of cylinder 132 and engages in a side milling 134 made in the piston 120.

A horizontal arm 142 is keyed onto the lower end of the shaft 120. The free end of the arm 142 carries a vertical-axis bush 144 which houses a replaceable cup 146 arranged to receive a gob of molten glass. The vertical and angular reciprocating movements of the shaft 120 and of the cup 146 are indicated by the double arrow C and double arrow D respectively in FIG. 5. These movements will be referred to later when the working of the machine is described.

The seat 112 adjacent the seat 110, houses a second operating unit or blowing unit 148 which incorporates a vertically slidable tool-carrier, in the form of a rod 150, and a piston 152 movable in a double-acting pneumatic cylinder 154. The rod 150 is hollow and a blowing tube 156 extends coaxially through the rod from a union 158 carried on the upper end of the rod 150. The union 158 is connected to the outlet of the valve 98 associated with the assembly 100 under consideration.

The lower end of rod 150 carries a replaceable tool constituted by a porous forming plunger 160 for the rough-blanking of the glass article to be manufactured. The plunger 160 can be lowered and raised by appropriate operation of the cylinder 154. Air fed down the blowing tube 156 can pass through the porous plunger 160.

Surrounding the plunger 160 in its raised position is a rotatably-mounted hollow mandrel 162 which carries towards its lower end a collet or gripper head 164. The collet 164 comprises radially movable jaws 166, whose inwards and outwards radial displacement is effected by the descent and ascent respectively (see double arrow E) of a sleeve 168. The movement of the sleeve 168 is controlled by a pneumatic actuator (not shown) which is mounted on the block 106. As will be more fully described below, the collet 164 serves first to assist in the containment of a gob of glass whilst it is being formed by plunger 160, then, if required, to draw the rough-blank glob into rotation during blowing, and finally serves to hold the formed glass article during cooling.

To enable the mandrel 162 to be driven in rotation, a sprocket wheel 170, is keyed onto the mandrel 162.

The seat 114 contains the upper part of a further operating unit 172. This unit 172 comprises two coaxial shafts 174, 176 each of which carries (at its lower end) a respective half shell 178, 180 intended to carry a respective die half. At their upper ends the two coaxial shafts 174, 176 carry respective conical-toothed gears 182, 184 which mesh with a common conical gear 186 whose axis is horizontal. The arrangement is such that with the shafts 174, 176 rotated into a position in which the half shells 178,180 and the die halves are closed together, the axis of the closed die coincides with the axis of the plunger 160 and of the tool 150.

The gear 186 is fast for rotation with a toothed pinion 188 which meshes with a vertical rack 190. The rack 190 is connected to the piston rod 192 of a piston 194 reciprocably slidable in a pneumatic cylinder 196. As will be better seen hereinafter, movement of the piston 194 in one direction, for example downwards, is arranged to cause the half shells 178, 180 (and their associated die halves) to open apart, while opposite movement of the piston 194 causes closure of the half shells 178, 180 and of the die halves.

The radially-innermost seat 116 contains the upper part of yet another operating unit 198. This unit 198 includes a vertical transmission shaft 200 slidably keyed onto the upper end of which is the driven part 202 of a friction clutch. The clutch is operated by a pneumatic cylinder 208. The driving part of the clutch is formed by a tubular element 204 which encompasses the shaft 200 and onto which is keyed a chain wheel 206.

A driving sprocket 170 is keyed onto the lower end of the shaft 200. This sprocket 210 has the same diameter and number of teeth as the sprocket 170. The two sprockets 210 and 170 are interconnected by a transmission chain 212.

The chain wheel 206 is driven from a transmission chain common to all the operating assemblies 100 and of which more will be said later. When the aforesaid friction clutch is engaged, the motion of the chain wheel 206 is transmitted via the clutch, the shaft 20, the sprocket 210 and the chain 212, to the sprocket 170 and therefore to the collet 164. The sprocket 170 and collet 164 will rotate the same angular speed as the shaft 200.

The operating unit 198 extends downwards from the sprocket 210 in the form of a tubular column 214 which houses an extension of the shaft 200. At its lower end, the column 214 carries a hollow arm 216 which projects radially outwards relative to the machine. The arm 216 carries a counterhead 218 at its outer end. The counterhead 218 rotatably mounts a counter-mandrel 220 which is vertically aligned with the mandrel 162 and is vertically slidable as indicated by the arrow G in FIG. 7. The mandrel 220 can be raised and lowered by means of a pneumatic actuator with an operator cylinder 222. To enable the mandrel 220 to be rotated in the same direction and at the same speed as the mandrel 162, the countermandrel 220 is connected to the aforesaid extension of shaft 200 by means of a chain drive passing through the arm 216 and a pneumatic friction clutch arranged in the counterhead 218. The chain drive comprises a driving chain and two sprockets identical to sprockets 210 and 170. The friction clutch contained in the counterhead 218 is similar to the clutch 202-204.

For purposes which will be explained later, the column 214 is detachable from the operating unit 198 in order to remove the counterhead 218 and countermandrel 220 from the operating assembly 100 when they are not required. The function of the countermandrel 220 will be explained later.

As can be seen in FIG. 2 the chain wheels 206 of the article-forming assemblies 100 are all engaged by a common transmission chain 224 which extends around the whole circumference of the machine. The chain 224 engages each wheel 206 on its side which is directed radially inwards of the machine. This enables easy removal of one of the assemblies 100 without complicated handling of chain 224, which remains in its place. In this manner the machine has the advantage of being able to function even when one or more assemblies 100 are absent through having been removed for repair and maintenance. In order to take up any slackness in the chain 224 which could result from the absence of an assembly 100, adjustable take-up sprockets 226 are provided. These sprockets 226 engage the chain 224 on its side radially innermost relative to the machine and urge the chain radially outwards to maintain it taut between each assembly 100. Each of the sprockets 226 is carried on a column, not shown in detail, which is displacable along a radial slot or groove 228 formed in the corresponding plate 104.

The chain 224 is driven from an electric motor 232 via a speed control unit 234. The motor 232 and unit 234 are interconnected by a transmission chain 236 and are mounted on a bracket 230 of the carousel which is positioned opposite to the bracket 86. The unit 234 is drivingly coupled to a sprocket arranged beneath one of the sprockets 226 by means of a transmission chain 237.

From the foregoing, it can be seen that the motor 232 drives the input chain wheels 206 of all the assemblies 100 simultaneously and at the same speed enabling the mandrels 162, (and, when required, the countermandrels 220) of all the assemblies 100 to be rotated at the same speed when the friction clutches of the assemblies are engaged.

Figure 9:
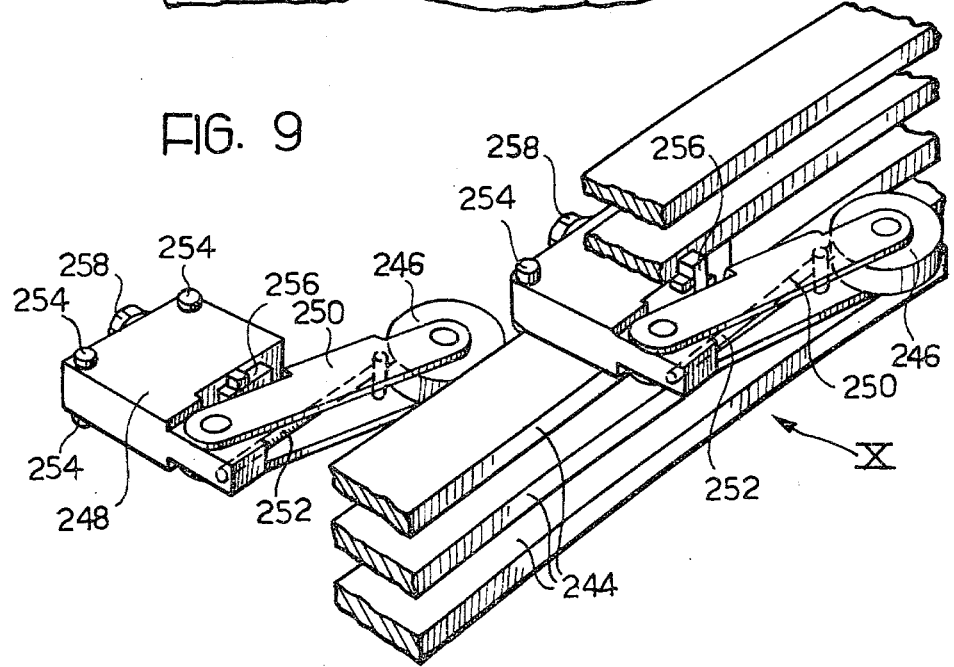
FIG. 9 is a perspective view to an enlarged scale of a detail of FIG. 10, in which a roller-carrying block is shown installed between two guides and another roller-carrying block is shown disengaged from the guides.

The superstructure 20, which is fixed in relation to the base 10, comprises a peripheral ring 238. This ring 238 carries fixed downwardly-extending columns 240 at predetermined positions around its periphery. As can be seen in FIGS. 6 and 8, each column 240 hingedly mounts two curved frames 242 at the height of the operating assemblies 100. These frames 242 comprise a series of horizontal curved plates 244 arranged one above another at equal spacings. When all the frames 242 are in a 'closed' position in which they extend circumferentially of the carousel, the adjacent pairs of curved plates 224 form substantially continuous curved guides. These guides serve to mount in preselected adjustable positions a set of primary control members the preferred embodiment of which is illustrated in FIGS. 8 to 10. As is clearly illustrated in FIG. 9, each primary control member comprises a small vertical axis roller 246. Associated with each small roller 246 is a support in the form of a prismatic block 248 of a thickness corresponding to the spacing between adjacent blades 244. An arm 250 is mounted on the block 248 for movement about a vertical axis. The arm 250 carries the small roller 246 at its free end. The arm is biased by a pin shaped spring 252 to a position away from block 248.

In order to fix the block 248 in a desired position between two blade 244, it is inserted in this position between the blades themselves, from the outside of the machine inwards. The block 248 is provided with projections 254 arranged to abut against the external edges of the blades between which it is inserted. The block 248 is also provided with a locking bar 256 keyed onto a spindle provided with an hexagonal control head 258. When block 248 is inserted between two blades 244, the bar 256 is in the position illustrated on the left in FIG. 9, in which it does not interfere with the blades. When the block 248 has been inserted as far as possible so that its projections 254 abut against the blades 244, the bar 256 is made to rotate through 90° to the position illustrated on the right in FIG. 9 by acting on the head 258. In this position, the bar 256 extends transversally relative to the adjacent blades 244 and engages the radially-innermost edges of these blades considered relative to the machine. The bar 256 thus serves to trap the blades 244 between itself and the projections 254 and in doing so is arranged to produce a firm secural of the block 248 and of the small roller 246. This situation is illustrated in FIG. 10.

Each article-forming assembly 100 is provided with a respective set of secondary control members intended to cooperate with the primary control members formed by the small rollers 246. To this end a support or upright 260 (FIG. 5) is fixed to one side of the block 106 and carries on its vertical face which is directed towards the outside of the machine, a vertically-extending series or battery of valves 262 each of which is either an on/off or change-over valve. Each of these valves 262 has an inlet connected to the compressed air feed pipe 68 of the assembly 100. Where the valve 262 is an on/off valve, its sole outlet is connected to the inlet of one of the single-acting pneumatic actuators of the same assembly 100 (for example, to the actuator of either of the pneumatic friction clutches associated with the shaft 200, or to the actuator associated with the collet 164). Where the valve 262 is a change-over valve, its two outlets are connected to the two opposed sides of one of the double-acting pneumatic actuators of the assembly 100 (for example, to the pneumatic cylinder 132 which produces movement of the cup 146, to the pneumatic cylinder 154 which produces movement of the plunger 160, to the pneumatic cylinder 196 which causes the opening and the closing of the half shells 178,180, or to the pneumatic cylinder 222 for raising and lowering the countermandrel 220).

Each valve 262 is provided with an operating cam formed by a rocker 264 which is pivotal about a vertical axis between two positions. As can be seen from FIG. 5, all the rockers 264 are vertically aligned.

Each rocker 264 comprises a pair of vertically offset arms 264a and 264b. The arrangement of the rockers is such that the lower arm 264a of the rocker 264 associated with the lowermost valve 262, is at the level of the space between the two lowest blades 244 while the other arm 264b of that rocker is at the height of the inter-blade space immediately above. The arm 264a of the rocker 264 associated with the valve 262 second up from the bottom of the battery of valves 263 is at the level of the third inter-blade space (considered from the bottom upwards) and the other arm 264b of that rocker is at the height of the fourth inter-blade space and so on. In order to operate the lowermost valve 262 in such a way as to activate its associated actuator, a first primary control member is mounted in the first inter-blade space (considered from the bottom upwards) such that its roller 246 will engage the arm 264a of the rocker 264 associated with the lowermost valve 262 to cause a change in the operating state of the valve. To de-activate the associated actuator, a second primary control member is mounted in the second interblade space at a predetermined circumferential distance from the first control member and downstream thereof relative to the direction of rotation of the carousel. The circumferential spacing of the first and second primary control members depends on the speed of movement of the carousel and on the time for which the actuator in question has to remain activated. As the roller of the secondary primary control member engages the other arm 264b of the lowermost rocker 264, the associated valve 262 will be returned to its original state thereby deactivating the actuator unit in question.

It will be appreciated that the primary control members described above (small rollers 246) are common to all assemblies 100 and cause the activation or de-activation of the corresponding actuator of each assembly 100 in the same spatial and timing conditions for each assembly 100 in turn (this being due to the fact that corresponding secondary control members of different assemblies 100 are arranged in identical positions relative to their respective assemblies). Such spatial and timing conditions may be adjusted at will simply by the displacement of the primary control members along the guides formed by blades 244.

As already mentioned, each frame 242 is hinged along one of its vertical sides. Each frame 242 thus forms a gate which can be opened to allow the removal or insertion of an assembly 100 from or into the machine. This is clearly illustrated in FIG. 2 where, in the lower part of the Figure two frames 242 are shown in an opened out position to permit the passage of an assembly 100a.

With reference now to FIGS. 5, 6 and 11 to 14, a description will be given of the blowing control means used to control the blowing of air during moulding of a glass article. The valve 98 of each article-forming assembly 100 is mounted beneath the battery of valves 262 on the same side of the block 106. The valve 98 comprises a body 266 which defines a cylindrical cavity 274 the axis of which is radially directed in relation to the machine. At its radially inner-most end, the cavity 274 communicates via a union 268 mounted on the body 266 with piping 270 which connects with the union 158 (FIG. 7) of the blowing unit 148.

The cavity 274 also communicates via an inlet union 272 mounted on the side of the body 266 with one of the pipes 96 fed with air from the motor compressor 88.

A cylindrical slide valve element 276 is arranged to slide within the cavity in sealed relation to the cavity wall. A helical compression spring 278 urges the slide valve element 276 in a radially outwards direction relative to the machine (that is, towards the left in FIG. 14). The end portion of the slide valve element 276 remote from the union 268 is fork shaped and mounts a small follower roller 282 with its axis vertical.

Figure 14:
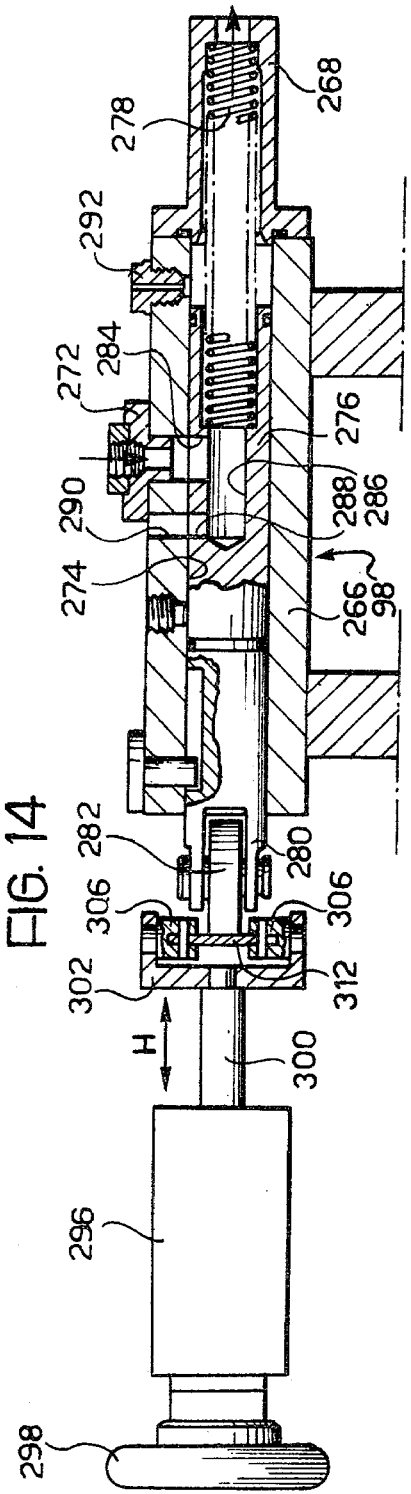
FIG. 14 is a section on line XIV—XIV of FIG. 11, but to an enlarged scale.

When the valve element 276 is in its "at rest" position shown in FIG. 14, the inlet union 272 fully communicates with a wide side opening 284 in the slide valve element. This side opening opens into an axial hole 286 of the valve element 276 which is in permanent communication, through the union 268, with the piping 270 and therefore with the blowing tube of the unit 148. Leading off from the axial hole 186 is a side breather opening 288 which, in the "at rest" position of the valve element 276 shown in FIG. 14, is in communication with a breather hole 290 formed in the side of the body 266 and opening into the atmosphere.

When the valve 98 is in its "at rest" position, (corresponding to the "at rest" position of the valve element 276), the low pressure blowing air which enters through union 272 is completely discharged through the breather opening 288 and the breather hole 290.

Upon the slide valve element 276 being displaced radially inwards relative to the machine (towards the right in FIG. 14) by forces applied to the roller 282, the communication between the opening 288 and the hole 290 progressively closes, so that blowing air is directed in increasing quantity and pressure to the blowing unit 148. The valve 98 is thus a proportional flow control valve. The body 266 is provided with a metering jet 292 adjacent to the union 268. This jet 292 may be selected as required to produce a predetermined blowing air throughput and pressure.

Control of the valve 98 is achieved by means of an arrangement illustrated in FIGS. 11 to 14. Attached to the bottoms of the columns 240, to which the frames 242 are hinged, is a curved plate 294. Regulator blocks 296 are fixed at regular intervals along the plate 294. Each of these blocks 296 carries, on the outside of the machine, a handwheel 298 which is connected to a micrometer regulator screw mounted in the block 296. This screw is extended by a shaft 300 beyond the block 296 towards the inside of the machine. By rotation of the handwheel 298, the shaft 300 can be displaced to and fro as indicated by the doubleheaded arrow H in FIG. 14.

The end of the shaft 300 nearest the inside of the machine carries a stirrup or C shaped fork 302. Two pairs of aligned cylindrical blocks 304 and 306 are mounted on the stirrup 302 for rotation about vertical axes. The blocks 304 and 306 have respective slots 308, 310.

Figure 11:
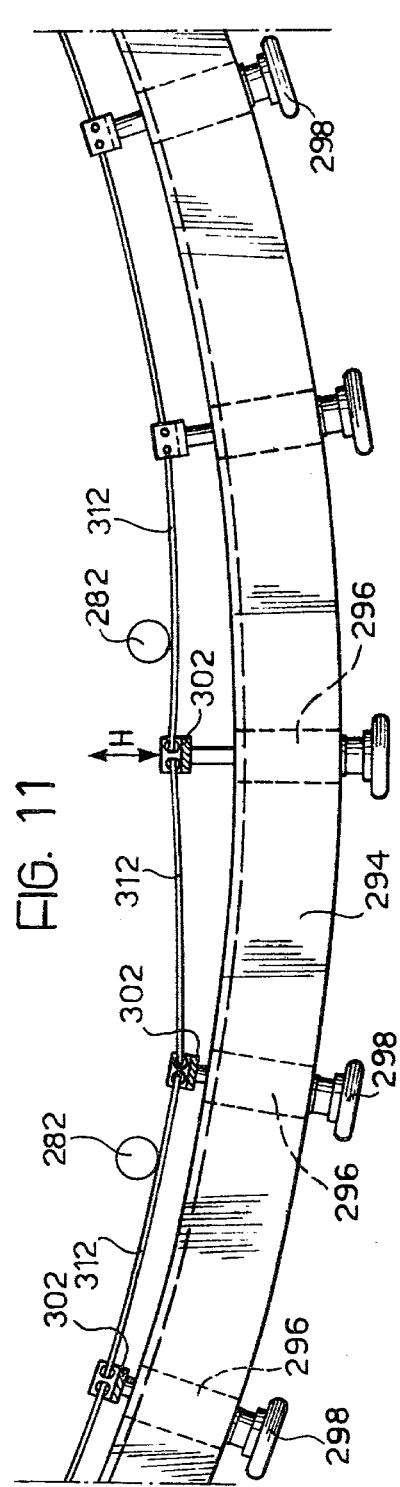
FIG. 11 is a partial plan view from above of a peripheral linear cam for controlling the supply of blowing air during blow-moulding.

The slots 308, 310 serve to accommodate the ends of flexible metal strips 312, arranged one after another between the blocks 296 in the manner clearly visible in FIGS. 11 to 13. Each strip 312 extends from a pair of blocks 304 of one regulator block 296 to a pair of blocks 306 of an adjacent regulator block 296.

Each strip 312 is fixed to its associated pair of blocks 304 by means of two pins 305 each of which passes through a hole provided in a respective one of the blocks 304 at the level of the slot 308 and a hole 307 provided in the corresponding end of the strip 312. The strips 312 are not, however, fixed to their associated blocks 306 so that the corresponding end of each strip 312 is free to move in the slots 310. This arrangement serves to eliminate the flexing of strip 312 following thermal expansion.

The strips 312 extend around that portion of the machine's circumference which corresponds to the region in which each assembly 100 is in its blowing phase of operation. The strips 312 jointly form a linear cam which is situated at the height of the small follower rollers 282 of the modulator valves 98 of all the operating assemblies 100.

The profile of the aforesaid linear cam may be varied at will by operating the individual hand wheels 298 in such a manner as to effect a predetermined blowing program. This program may be modified at any time at the discretion of the machine controller and even whilst the machine is in operation.

The ability to vary the profile of the linear cam 312 not only enables the delivery of blowing air to be commenced or shut of as required, but also permits the pressure of the blowing air to be varied. Moreover since the physical location of the hand wheels 298 corresponds to the actual position at which blowing occurs, the operator is able to control the blowing easily and constantly. Amongst other modes of operation, it is possible to carry out blowing in a continuous manner or at intervals (in "puffs") at a finely adjusted and varied pressure in a similar manner to the mouth blowing formerly carried out by glass craftsmen.

From the foregoing it will be appreciated that the linear cam formed by the strips 312 serves as a further primary control member which by cooperation with the further secondary control members constituted by the valves 98 is operative to control the supply of blowing air to each assembly 100. Thus for each assembly 100 all the various means used to move and form the molten glass are controlled by the phased cooperation of respective primary and secondary control members as the carousel rotates. These various moving and forming means, which can be conveniently referred to as the operating means of each assembly, include all the various actuators of the operating units together with their associated mechanisms, and the blowing means, including the tube 156, used to form the glass by blow-moulding.

A description will now be given with reference to FIGS. 15 to 20, of a typical work cycle which may be executed by each of the assemblies 100 during rotation of the carousel 18. In this description further characteristics of the machine will be brought out.

A mechanical feeder working in conjunction with the machine serves to deliver consecutive gobs of molten glass, each of which is to form a glass article.

The feeder comprises a drop pipe or tube 314, (FIGS. 1 to 3 and 7) arranged on the periphery of the machine. The drop tube 314 has an outlet mouthpiece 316 situated just above the level of the cups 146 mounted in the bushes 144 when the arms 142 are in their lowered position.

The drop tube 314 constitutes a feed station the position of which is shown by $S_1$ in FIG. 2.

As the carousel is rotated by the motor 24 in an anticlockwise sense as viewed in FIG. 2, an assembly 100 is brought to the station $S_1$ with its arm 142 lowered and extended radially outwards relative to the machine. In this position of the arm 142, the cup 146 moves to a position immediately under mouthpiece 316 of tube 314 as the carousel rotates. As shown in FIG. 15, a small roller 318 is mounted on the mouthpiece 316 with its axis vertical. This roller 318 is arranged to partially block the passage of the bush 144 as is illustrated in FIG. 15. As the carousel continues to rotate in direction I and advances the shaft 120 carrying the arm 142, the bush 144 is temporarily restrained in a position in which the cup 146 is aligned with drop tube 314. Of course, as the shaft 120 is advanced, the arm 142 and the shaft 120 will start to rotate about the axis of the shaft in the opposite direction to that shown by arrow I.

The feeder is so synchronised with the machine that during the period of time in which the cup 146 is located below the tube 314, the latter delivers a gob of glass into the cup 146, as illustrated in FIG. 16. Adjustment of the synchronisation between the machine and the feeder can be effected by the hand wheel 54 (FIG. 4).

When the assembly 100 is at the station $S_1$, the half shells 178 and 180 which carry the die halves are open, that is, each of them is turned to a position which is substantially at 90° to that shown in FIG. 5 (see half shell 180 in FIG. 16). In this position of the half shells 178 and 180 the space under the head or collet 164 is free.

In the present case, as will be better seen later, the two die halves fixed to the half shells 178 and 180 are such that they together define an open ended mould, as illustrated in section in FIG. 18, in which the die halves have been referenced 320 and 322 respectively. The bottom end of the mould is defined by a mould end 324 which is carried on the counter-mandrel 220. This countermandrel 220 is in a fully lowered position when at the feed station $S_1$.

As soon as the operating assembly 100 under consideration has left feed station $S_1$, the rocker 264 associated with the cylinder 132 of the operating unit 118 is tripped by one of the small rollers 246 and the cylinder 132 is activated. As a result, the shaft 120 and arm 142 are further rotated in the same direction J as they were caused to rotate by the blocking action of the small roller 318. Rotation of the shaft 120 and cam 142 continues until the arm 142 extends radially inwards of the machine. At the same time, the shaft 120 and arm 142 are raised by activation of the cylinder 124 into the position illustrated in FIG. 17, in which the cup 146 is located directly beneath the collet 164. This transfer of the cup 146 from beneath the feed station to a position directly below the collet 164 occurs over an arc of the machine indicated by $S_2$ in FIG. 2.

At this point, the rocker 264 associated with the operating cylinder 154 of the plunger 160 is tripped by a corresponding one of the small rollers 246 and the toolcarrier rod 150 and the plunger 160 descend. The plunger 160 is so profiled as to transform the gob contained in the cup 146 into a glass rough-blank or parison of suitable form for final blowing. The rough-blank is shown as PR in FIG. 17.

Under the action of the plunger 160 an upper peripheral part of the rough-blank PR is forced into the space between the jaws 166 of the collet 164, forming a neck which can be gripped by the jaws themselves.

The foregoing plunging or moulding operation occurs in a moulding station which extends over an arc of the machine indicated by $S_3$ in FIG. 2.

Whilst the plunger 160 is still lowered, the rocker 264 associated with the pneumatic actuator controlling the jaws 166 is tripped by a corresponding small roller 246. As a result, the jaws 166 close, as indicated by arrow K in FIG. 17, clasping the neck of the rough-blank PR.

This operation occurs at a gripping station which extends over an arc $S_4$ of the machine.

Once the rough-blank PR has been gripped by the collet 164, the shaft 120 and arm 142 are lowered and moved back to their initial positions shown in FIG. 16 while the rough-blank PR remains suspended from the collet 164.

Immediately after this, the die halves 320 and 322 begin closing together (arrow L, FIG. 18) due to the tripping of the rocker 264 associated with the cylinder 196. At the same time, the pneumatic actuator of countermandrel 220 is activated causing the latter to ascend (arrow M, FIGS. 17 and 18) carrying the mould end 324 to close the mould.

In the present example, the mould constituted by the elements 320-322-324 is intended to form a glass vessel with smooth sides. In order to obtain a good quality product, the wall of the vessel should be without any sign of, or ridge resulting from, the joining of the mould elements. To this end, prior to the closing of the mould, the pneumatic friction clutch 202-204 is engaged thereby causing the head 164 to rotate drawing the blank PR into rotation. The friction clutch contained in the counter head 218 is also engaged to cause the countermandrel 220 and the mould end 324 to rotate for a purpose to be explained later.

The collet 164 and the mould end 324 thus rotate at the same speed and in the same direction (indicated by arrow N in FIG. 180.

All the aforesaid operations are substantially completed by the time the assembly 100 in question leaves the station $S_4$ and immediately thereafter the small roller 282 associated with the valve 98 engages with the linear cam formed by the strips 312. The blowing of the rough-blank PR now commences through the porous plunger 160 with the mould closed and with the rough-blank PR and the mould end 324 rotating (see FIG. 18). The blowing of the roughblank into a finished article takes place in a blowing station which extends over an arc of the machine shown by $S_5$ in FIG. 2.

As the rough-blank PR expands, it eventually comes into contact with the mould end 324. Since the latter is rotating at the same speed as the now partly formed blank SB (FIG. 18), if the mould end is formed with marks, such as words, numbers or the like, these marks will be neatly impressed on the glass article under manufacture.

The finished article, contained in the mould and still rotating, is shown by OG in FIG. 19.

At the end of the blowing operation, the die halves 320, 322 are opened (arrow O, FIG. 20) and the mould end 324 lowered. Thereafter, rotation of the collet 164 and of the counter-mandrel 220 is halted. All these operations take place due to the tripping of the rockers 264 by corresponding ones of the rollers 246.

The article-forming assembly under consideration now passes through a cooling station which extends over an arc $S_6$ (FIG. 2). During this period, the glass article (vessel) OG remains suspended from the collet 164, owing to the fact that the jaws 166 are kept closed around the neck of the article OG. The article OG undergoes cooling, which may be necessary to improve by a current of forced air.

A rotating delivery table 326 (FIGS. 2 and 20) is situated at the end of the cooling station $S_6$ immediately below the level of the path of the solidified glass articles OG and above the level of the mould end 324 in its lowered position. The direction of rotation of the table 326 is shown by arrow P in FIG. 2.

The position of the table 326 corresponds to a delivery station $S_7$, in which the jaws 166 of the collet 164 are opened due to the operation of the appropriate pneumatic actuator as the result of tripping of the corresponding rocker 268. The article is thus released to fall the short distance onto the table 326 and is taken away from the machine by an off-loading transporter 328 (FIG. 2) which moves the articles in the direction of arrow Q to an annealing furnace, for example.

The work cycle described above is repeated in an identical manner for each article-forming assembly 100 each revolution of the carousel.

Naturally the work cycle which has been described and illustrated shows only one of the many possible operating modes of the machine. Thus, for example, the mould defined by the die halves may have closed ends, in which case the whole assembly formed by the column 214, counterhead 218 and countermandrel 220 can be removed.

Alternatively, the countermandrel 220 may simply carry a support for a preformed foot and stem of a drinking glass. In this case the two die halves are such that they form the cup of the drinking glass and define in their lower part a hole through which the stem of the foot can be introduced, by raising of the countermandrel 220, in order to weld the stem to the bottom of the cup as the blowing of the latter reaches its conclusion.

The assemblies 100 are also capable of being used for the pre-blowing of articles without rotation, as for example in the case of manufacturing drinking glasses or other vessels simulating ground crystal. In this case it is sufficient to remove from the frames 242 the small rollers 246 which control the cylinder 208 of the pneumatic clutch 202-204.

Owing to the fact that the glass gob receiving cup 146, the die halves, the mould end and the plunger may be replaced by other elements of corresponding functions but of very different forms, the described machine is capable of forming hollow glass articles with a great variety of forms.

Another advantage of the described machine lies in that for purposes of maintenance or repair, the operating assemblies 100 can be readily removed and replaced and the machine itself may be kept in operation even when one or more assemblies are absent.

Moreover, the repair or maintenance of each articleforming assembly 100 is facilitated by the fact that the individual operating units 118, 148, 172 and 198 are extremely easy to remove and replace.

Various modifications to the described machine are of course possible. Thus, for example, instead of a pneumatic operating system with valves and control cams, the machine may be fitted with an electropneumatic or electromagnetic system, in which case the valves 262 would be replaced by electrical switches preferably of the magnetically-operable "proximity" type so that the small rollers 246 could be replaced by permanent magnets.

It is also to be noted that although the described machine has only a single feed station for the molten glass gobs and a single delivery station for the completed glass articles, it is possible to provide two or more feed stations equi-angularly spaced around the circular path of the operating assemblies, together with an equal number of delivery stations. In this case a corresponding number of further sets of primary control members would be provided so that each assembly would perform as many work cycles per revolution of the carousel as there were feed stations.

We claim:

1. A machine for the manufacture of glass articles by blow moulding, comprising:

a carousel mounted for rotation about a vertical axis, drive means for continuously rotating said carousel, a plurality of article-forming assemblies mounted on the carousel in a circumferentially-extending series and each comprising receiving means for receiving a gob of molten glass fed to the assembly, rough-blanking means including a plunger for moulding said molten-glass gob into a rough-blank, and blow-moulding means for blow-moulding the rough-blank into a required glass article, the said receiving, rough-blanking, and blow-moulding means of each assembly including a number of independently controllable operating means for moving and forming the molten glass, a feed station fixed adjacent the carousel and arranged to deliver a said gob of molten glass to the receiving means of each article-forming assembly in turn as it is moved therepast by rotation of the carousel, and control means for controlling the said operating means of each said assembly to function in accordance with a predetermined work cycle in the forming of a said glass article, said control means comprising a set of primary control members arranged in an adjustable manner in predetermined fixed positions around said carousel adjacent thereto, and a respective set of secondary control members associated with each article-forming assembly for movement therewith during rotation of the carousel, the secondary control members of each set being arranged to control respective ones of said operating means of the associated assembly and being mounted on or adjacent that assembly in such positions that as the carousel rotates, the secondary control members are moved past and are influenced by respective said primary control members to control said operating means to operate in a sequence and with a timing dependent on the arrangement of said primary control members, the secondary control members which control corresponding operating means of different said assemblies being arranged in corresponding positions relative to their respective assemblies whereby the assemblies consecutively execute identical work cycles, each article-forming assembly comprising:

a first columnar structure incorporating a rotatable and vertically slidable shaft, first said operating means for raising, lowering and rotating said shaft, a horizontal arm carried on the lower end of said shaft, and a replaceable cup supported on the free end of said arm and arranged to receive a said glob of molten glass from the feed station, a second columnar structure incorporating a vertically slidable rod carrying at its lower end said plunger for rough-blanking the molten glass, second said operating means for vertically moving said rod and plunger, a hollow rotatably-mounted gripper head encompassing said plunger and including jaws for gripping a said rough-blank, third said operating means for rotating said gripper head, fourth said operating means for opening and closing the gripper head jaws, and fifth said operating means for directing a supply of blowing air into said hollow head to enable blow-moulding of a said rough blank, a third columnar structure incorporating a pair of coaxial vertical shafts which carry at their lower ends respective, replaceable, complementary die halves, and sixth operating means for jointly rotating said coaxial shafts in opposite senses, and a fourth columnar structure which carries at its lower end an arm projecting from the structure, a vertically-slidable counterhead mounted at the free end of said projecting arm in alignment with the gripper head, and seventh operating means for vertically moving the counterhead, said counterhead being arranged to carry selectively an additional element for closing the lower end of the mould space defined by said die halves or an additional element intended to form part of the blown article, the first operating means being operative under the control of its associated said control members to move a said glob of molten glass, deposited in said cup, from a position underlying said feed station to a position underlying the gripper head and from there to a raised position against the head itself, the second operating means being operative under the control of its associated said control members to force the plunger down into the molten-glass gob contained in the cup in its raised position in order to effect rough-blanking of the molten glass, the third, fourth and fifth operating means being operative under control of their respective associated control members to grip the said rough-blank, to entrain the rough-blank in rotation, and to supply air into the rough-blank to effect blow-moulding thereof and the sixth operating means being operative, under the control of its associated said control members to close said die halves together around said rough-blank for the duration of blow-moulding effected by said fifth operating means, and the seventh operating means being arranged to raise the counterhead, under the control of its associated control members, to introduce said additional element into the lower end of the said mould space.

2. A machine according to claim 1, wherein each said article-forming assembly includes a support block with a plurality of seats arranged in a row extending radially of the carousel and serving to accommodate in removable fashion respective operating units which together form the said receiving, rough-blanking and blow-moulding means of the assembly, said carousel comprising a carrying structure of circular plan form which is provided with a circular array of further seats each of which serves to locate a respective said assembly by accommodating the support block of the assembly.

3. A machine according to claim 2, wherein each said further seat is defined by a respective pair of radial guides which serve to support the corresponding assembly block in such a manner as to enable its installation and removal by being moved radially inwards and outwards along said guides.

4. A machine according to claim 2, wherein at least some of said seats of the assembly support block are formed by vertical, substantially cylindrical, holes and the operating units associated with these seats comprise separate columnar structures inserted into the vertical holes.

5. A machine according to claim 1, wherein the counterhead is rotatably mounted on said projecting arm and can be selectively rotated at the same rotation speed as the gripper head from said fourth operating means.

6. A machine according to claim 5, wherein rotation of said counterhead is effected by means of a transmission which comprises a vertical shaft forming part of said fourth columnar structure, and driving chains extending between the shaft and both the gripper head and the counterhead.

7. A machine according to claim 1, wherein the said fourth operating means comprises a carousel-mounted motor common to all said assemblies, a respective vertical shaft belonging to each assembly, a respective clutch associated with each said vertical shaft of the fourth operating means, said clutch being operated under the control of the said control members associated with the fourth operating means, and a common chain drive which connects said motor to the driving part of all said clutches.

8. A machine according to claim 7 in combination, wherein in each article-forming assembly the said vertical shaft of the fourth operating means constitutes the said vertical shaft of the fourth columnar structure.

9. A machine according to claim 1, wherein the feed station comprises a drop tube for delivering successive gobs of molten glass, and means engageable with the said horizontal arm carrying the receiving cup of each assembly to keep that cup stationary under the drop tube for a certain angle of rotation of the carousel with a resultant initial rotation of the arm relative to the remainder of the first columnar structure of which it forms a part, the said first operating means being arranged to permit such an initial rotation.

10. A machine according to claim 1, comprising cooling means for cooling the operating assemblies carried by the carousel, said cooling means including at least one circulation pump mounted on the carousel, and a fixed annular tank arranged coaxially beneath the carousel, the circulation pump having an inlet mouthpiece arranged to draw off water from said fixed tank as the carousel rotates.

11. A machine according to claim 1, wherein said blow-moulding means of each article-forming assembly includes a said operating means arranged to form said molten glass by blowing air into said rough-blank, and a carousel-mounted air compressor, common to more than one assembly, for supplying air to said blowing operating means.

12. A machine for the manufacture of glass articles by blow moulding, comprising:
a carousel mounted for rotation about a vertical axis,
drive means for continuously rotating said carousel,
a plurality of article-forming assemblies mounted on the carousel in a circumferentially-extending series and each comprising receiving means for receiving a gob of molten glass fed to the assembly, rough-blanking means including a plunger for moulding said molten-glass gob into a rough-blank, and blow-moulding means for blow-moulding the rough-blank into a required glass article, the said receiving, rough-blanking, and blow-moulding means for each assembly including a number of independently controllable operating means for moving and forming the molten glass, said blow-moulding means of each article-forming assembly including a said operating means arranged to form said molten glass by blowing air into said rough-blank during blow-moulding, and a blowing-air supply for supplying air to the blowing operating means,
a feed station fixed adjacent the carousel and arranged to deliver a said gob of molten glass to the receiving means of each article-forming assembly in turn as it is moved therepast by rotation of the carousel, and
control means for controlling the said operating means of each said assembly to function in accordance with a predetermined work cycle in the forming of a said glass article, said control means comprising a set of primary control members arranged in an adjustable manner in predetermined fixed positions around said carousel adjacent thereto, and a respective set of secondary control members associated with each article-forming assembly for movement therewith during rotation of the carousel, the secondary control members of each set being arranged to control respective ones of said operating means of the associated assembly and being mounted on or adjacent that assembly in such positions that as the carousel rotates, the secondary control members are moved past and are influenced by respective said primary control members to control said operating means to operate in a sequence and with a timing dependent on the arrangement of said primary control members, the secondary control members which control corresponding operating means of different said assemblies being arranged in corresponding positions relative to their respective assemblies whereby the assemblies consecutively execute identical work cycles, and each said set of secondary control members including a proportional airflow control valve connected into said blowing-air supply and arranged to control the flow of air to said blowing operating means, said proportional valve being provided with a control element coupled to a follower which is movable radially relative to the axis of the carousel, and the primary control member arranged to influence the said secondary control members formed by the proportional valves comprising a plurality of strips arranged to engage said follower of each proportional valve and support means supporting said strips at their ends such that they lie in a circumferentially-extending series and in a manner enabling said ends to be finely adjusted in position towards and away from the axis of the carousel, said plurality of strips extending in an arc of predetermined angular extent around said carousel.

13. A machine according to claim 12, wherein said strips are flexible in a horizontal plane.

14. A machine according to claim 12, including a further feed station arranged adjacent said carousel angularly spaced there-around from said first-mentioned feed station, and a further set of primary control members associated with the further feed station.

15. A machine according to claim 12, wherein at least some of the secondary control members each comprise a two-arm rocker pivotal about a vertical axis between two positions which respectively correspond to an operative state and an inoperative state of the corresponding said operating means, the two rocker arms being vertically staggered, and each two-arm rocker being arranged to cooperate with a pair of said primary control means formed by a pair of vertical-axis rollers supported on roller mounting means, said mounting means so mounting the rollers at spaced locations around the carousel with a mutual vertical stagger that each roller is arranged to engage a respective arm of the corresponding rocker; the roller which first engages the rocker as the carousel rotates being arranged to displace the rocker to its said position corresponding to the operative state of the associated operating means, and the roller which is second to engage the rocker as the carousel rotates, being arranged to move the rocker back to its said position corresponding to the inoperative state of the associated operating means, and each said roller being resiliently mounted by said mounting means such that the roller yields under the pressure of engagement with its respective rocker arm.

16. A machine according to claim 15, wherein the said operating means associated with each rocker is a fluid-operated actuator having an associated fluid supply circuit and fluid control valve connected into said supply circuit, said control valve being connected for operation by movement of the corresponding said rocker.

17. A machine according to claim 15, wherein said roller mounting means comprises a plurality of fixed circumferential guides arranged one above another and extending over an arc of rotation of the carousel, and respective supports resiliently mounting each roller, said supports being adjustably positionable in said guides.

18. A machine according to claim 17, wherein each said support comprises a body, an arm pivoted on the body for movement about a vertical axis and carrying said roller, and resilient biasing means reacting between the body and arm to urge the arm into a position where the roller lies in the path of the corresponding rocker arm.

19. A machine according to claim 18, wherein said guides consist of horizontal, parallel blades equidistantly spaced in the vertical direction, and the body of each said support is formed by a block the thickness of which corresponds to the vertical distance between adjacent said blades, each said block being provided with locking means for locking it in an inserted position between two blades.

20. A machine according to claim 19, wherein said locking means of each said block comprises projections arranged to engage the said two blades between which it is inserted by abutment against their outer edges considered radially of the carousel, and a locking bar rotatable between an unlocked position in which it is parallel to the blades and does not interfere with the blades, and a locked position in which it is arranged transversally in relation to the adjacent said blades and engages their inner edges to trap the blades between said bar and said projections.

21. A machine according to claim 12, wherein the primary control members are arranged around the outer periphery of the carousel.

* * * * *